Figure 1:
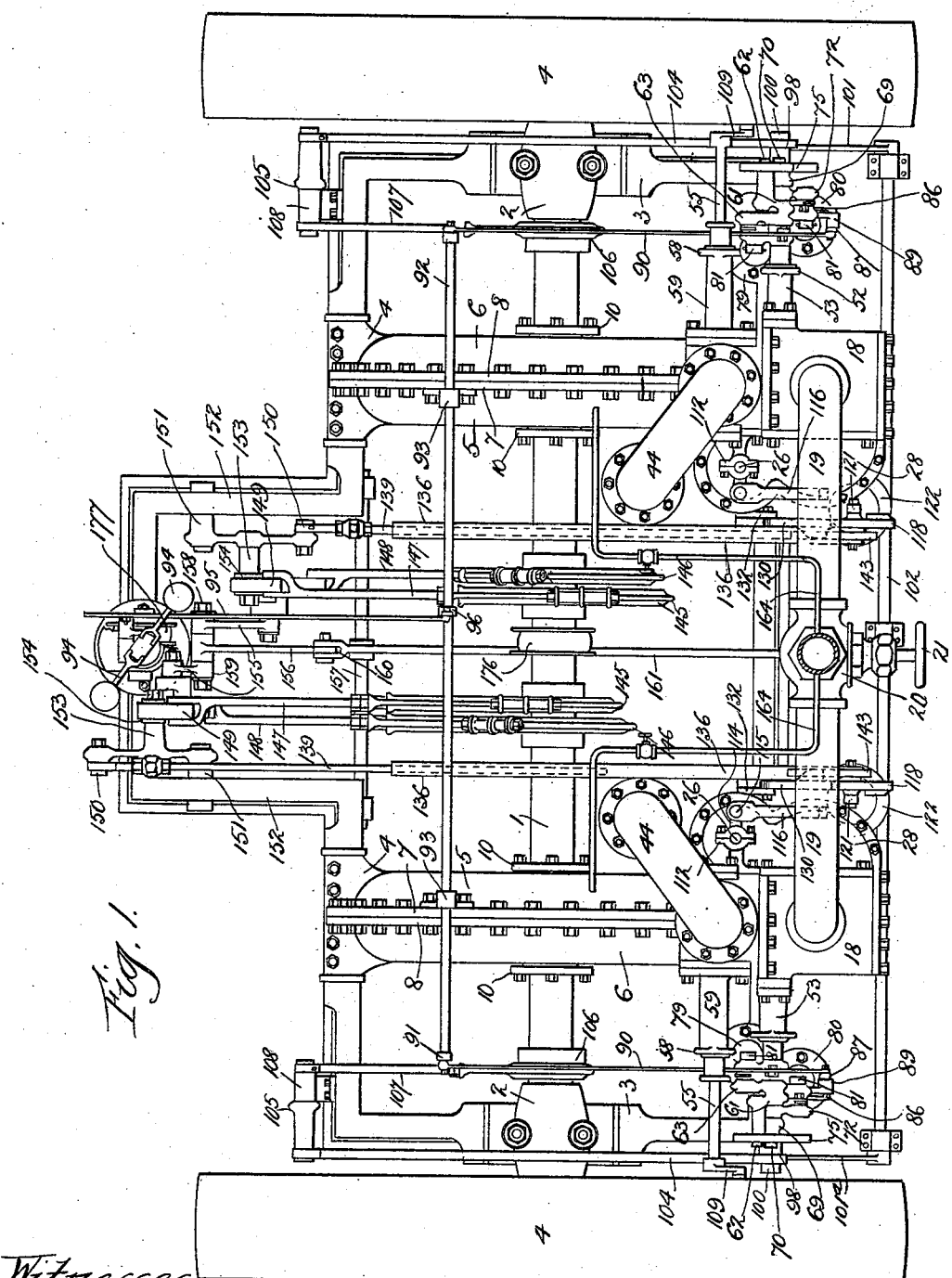

(No Model.)

9 Sheets—Sheet 1.

W. S. COLWELL.
ROTARY ENGINE.

No. 592,224.

Patented Oct. 19, 1897.

Witnesses

Inventor
W. S. Colwell
by Elliott & Hopkins
Att'ys (No Model.) 9 Sheets—Sheet 3.

W. S. COLWELL.
ROTARY ENGINE.

No. 592,224. Patented Oct. 19, 1897.

(No Model.)
9 Sheets—Sheet 4.
W. S. COLWELL.
ROTARY ENGINE.
No. 592,224. Patented Oct. 19, 1897.
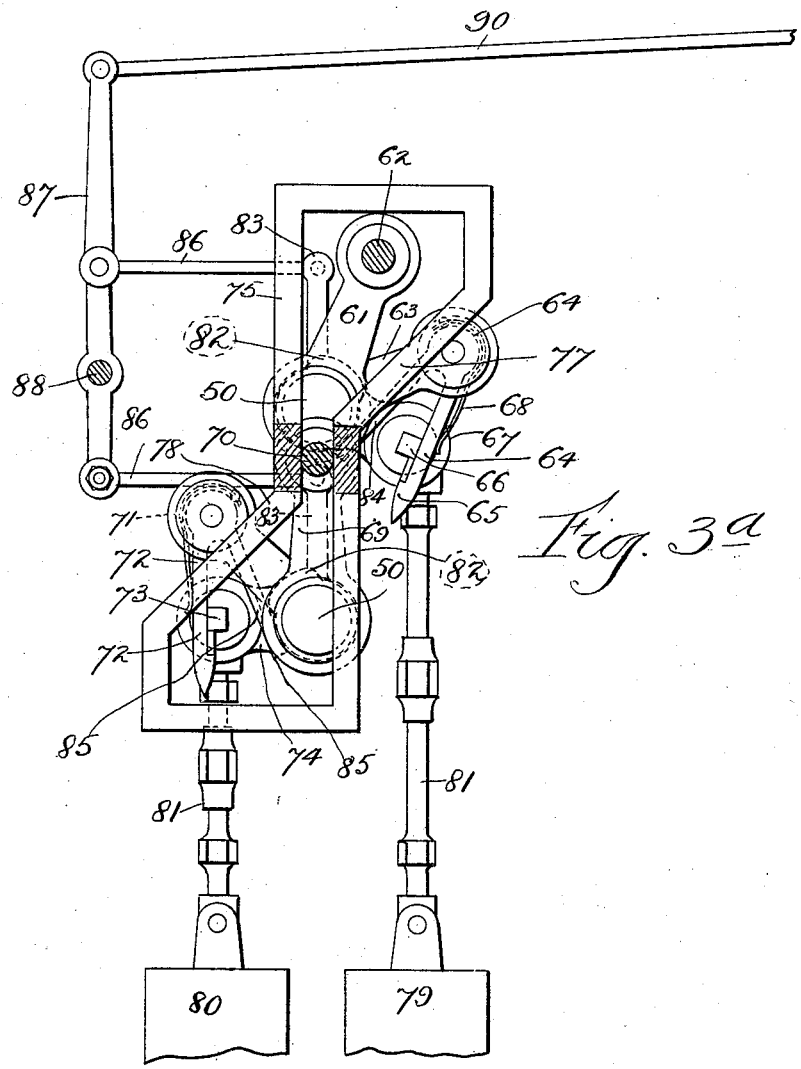
Fig. 3ª
Witnesses
Wm. F. Henning
Edna B. Johnson
Inventor
W. S. Colwell
by Elliott Hopkins
Attys.

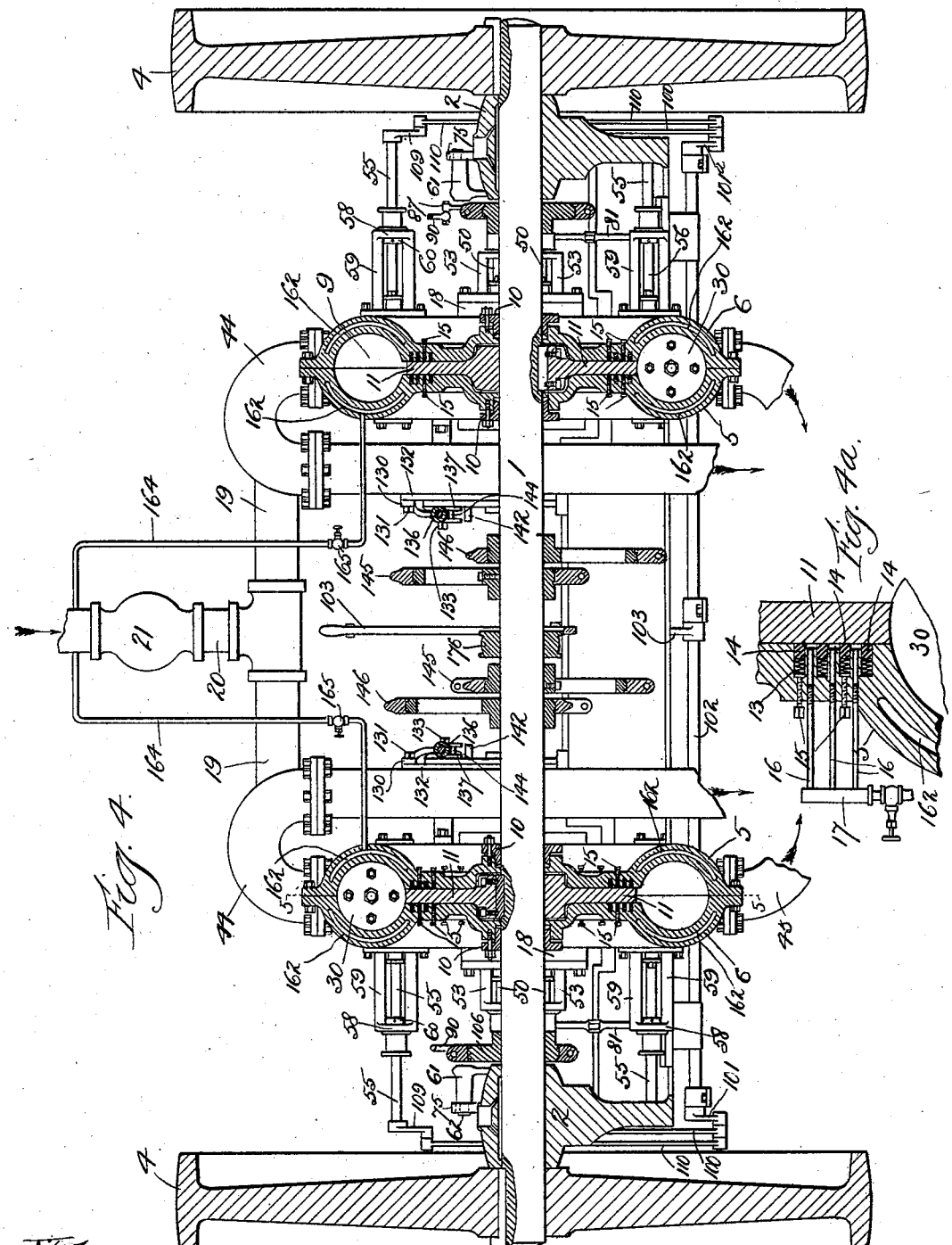

(No Model.) 9 Sheets—Sheet 6.
W. S. COLWELL.
ROTARY ENGINE.
No. 592,224. Patented Oct. 19, 1897.
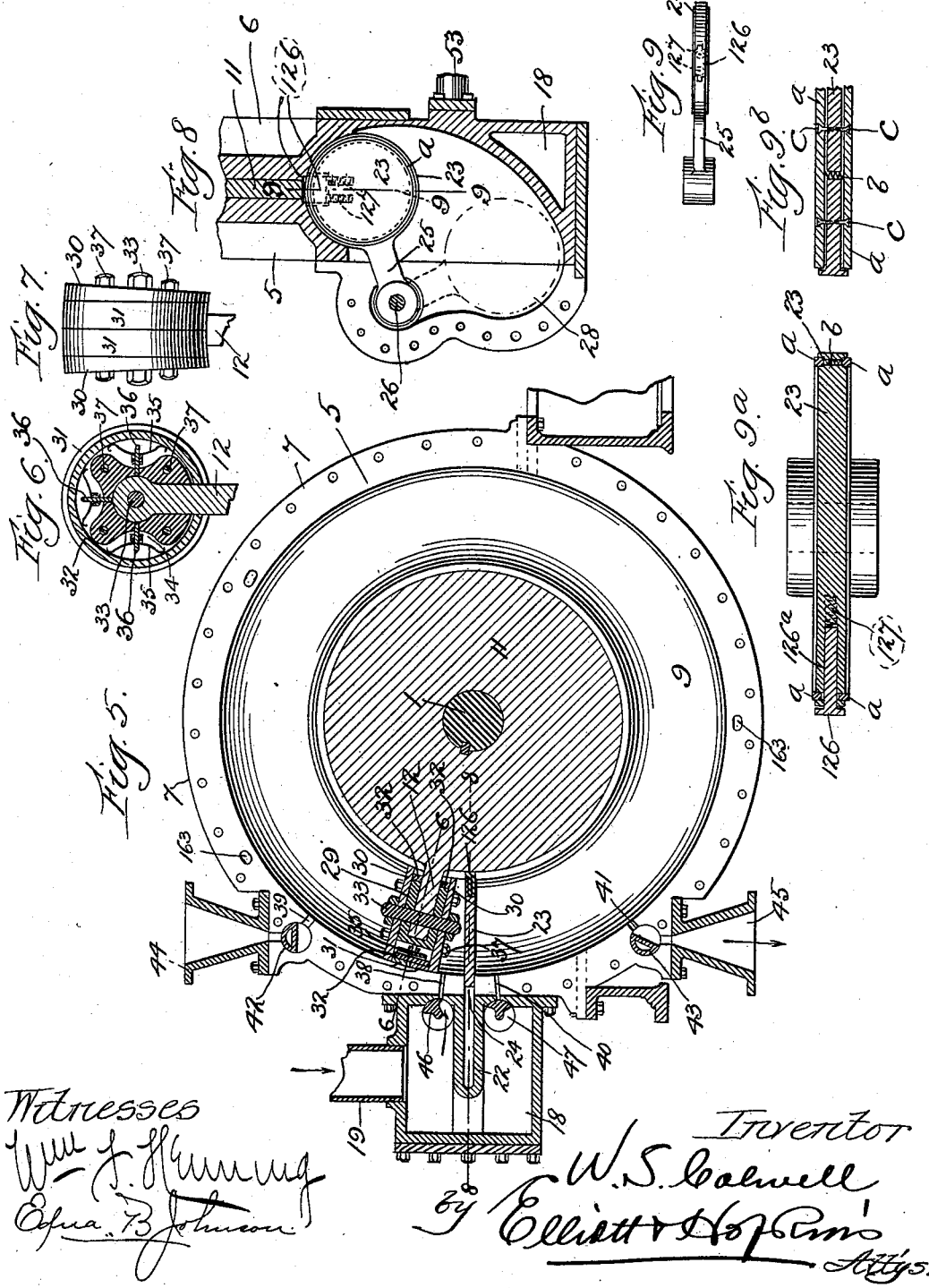
Witnesses
Inventor
W. S. Colwell
by Elliott & Hopkins
Att'ys.

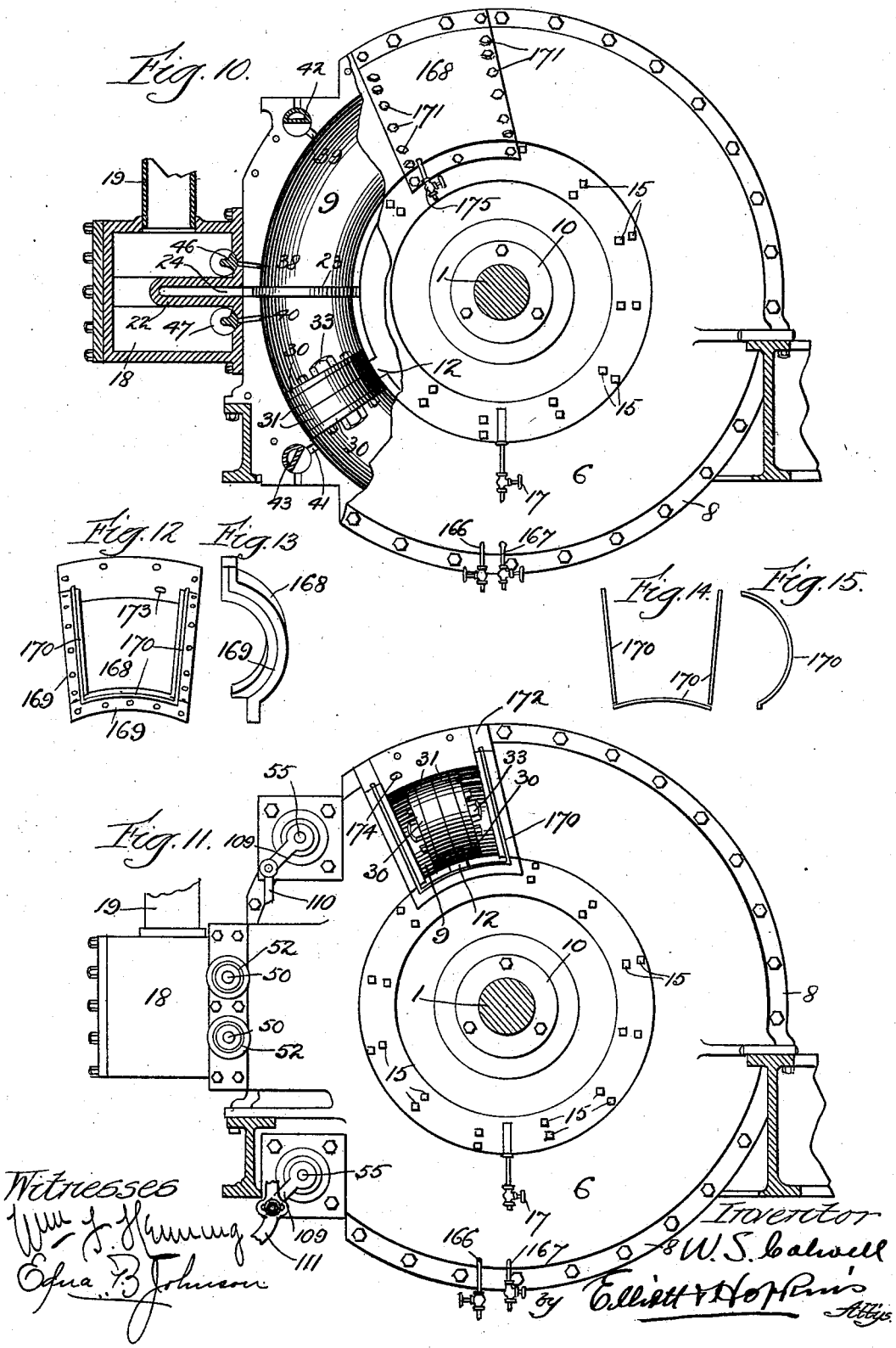

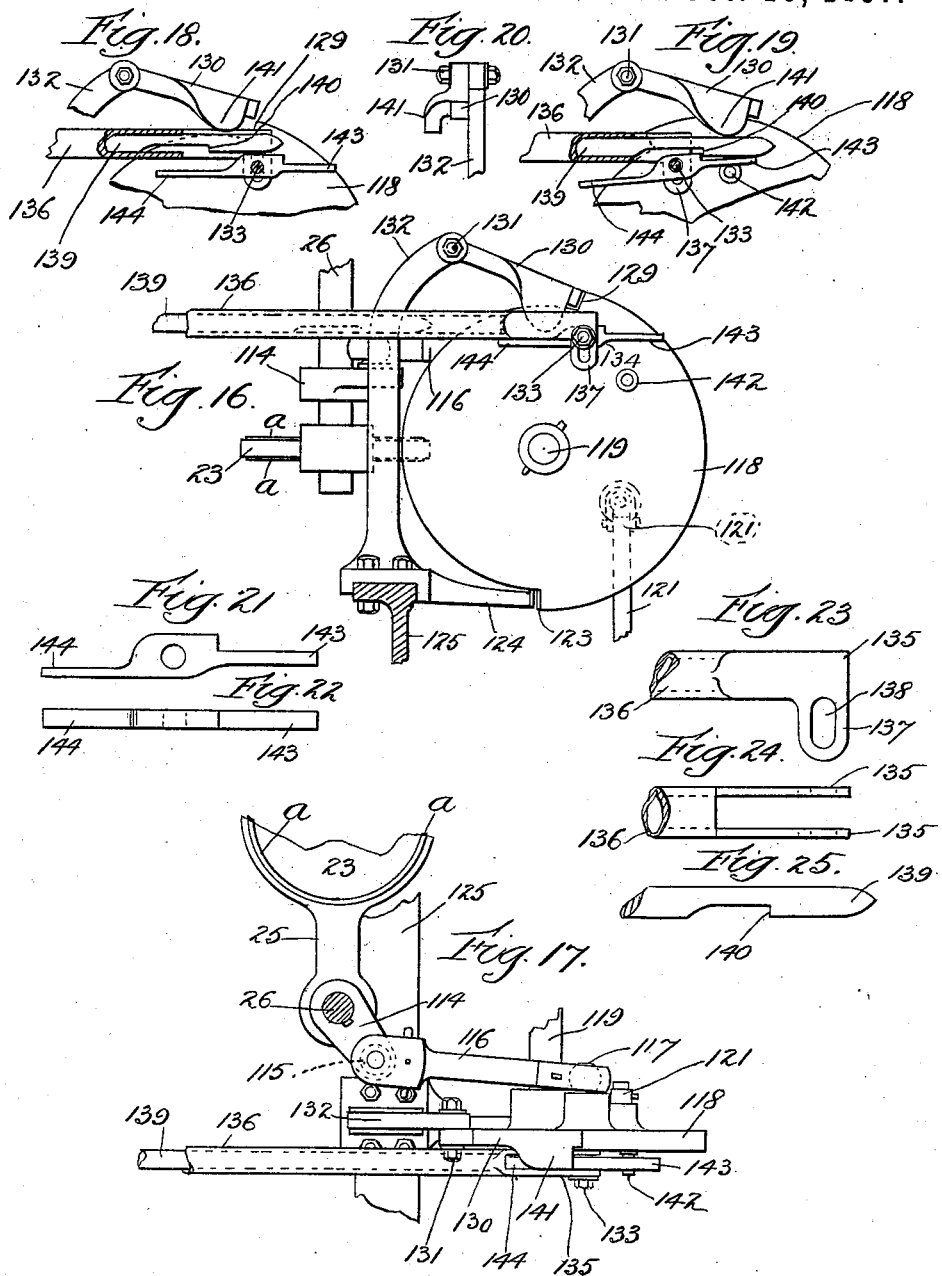

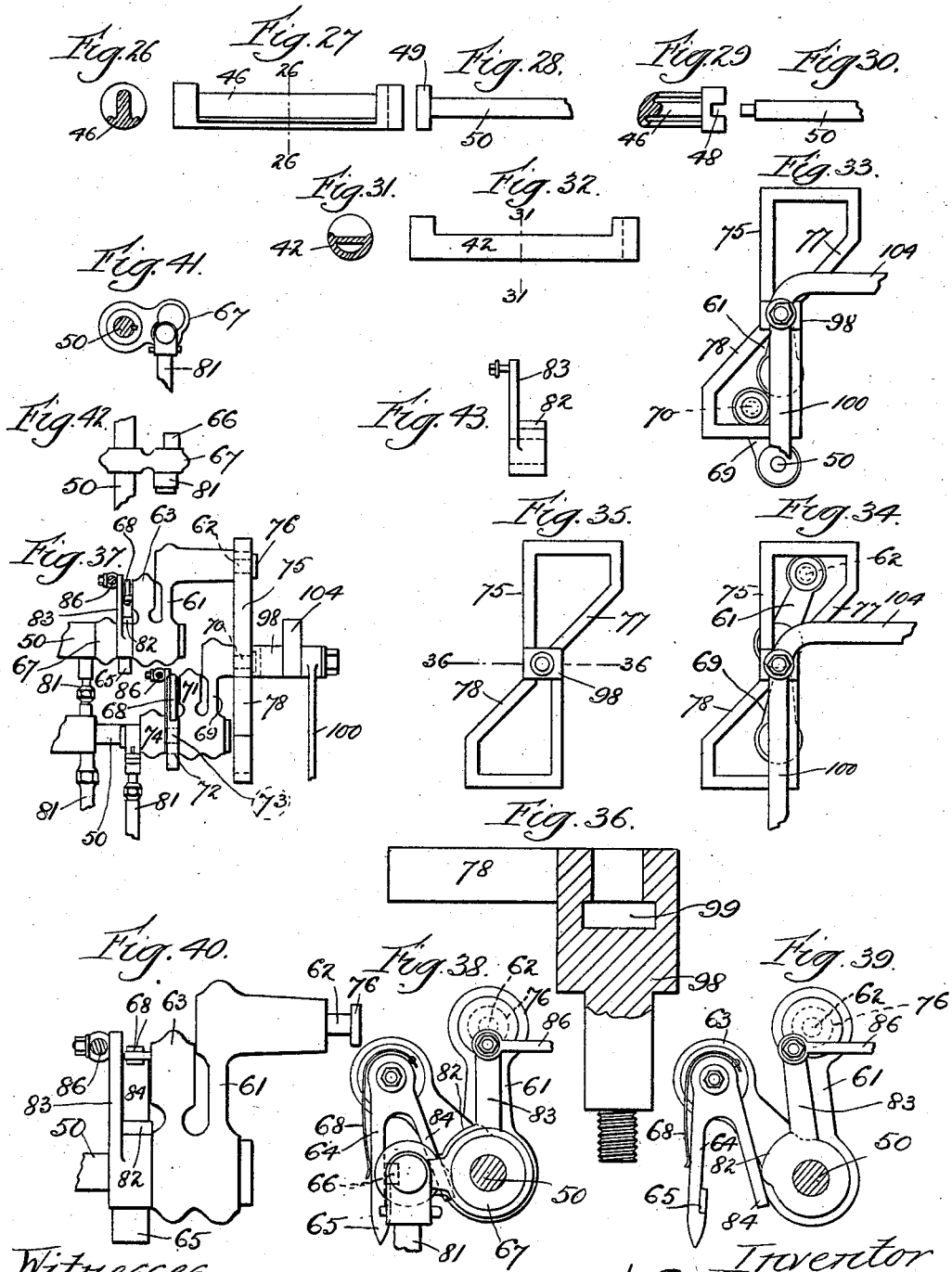

UNITED STATES PATENT OFFICE.

WILLIAM S. COLWELL, OF CHICAGO, ILLINOIS.

ROTARY ENGINE.

SPECIFICATION forming part of Letters Patent No. 592,224, dated October 19, 1897.

Application filed November 27, 1896. Serial No. 613,556. (No model.)

*To all whom it may concern:*

Be it known that I, WILLIAM S. COLWELL, a citizen of the United States, residing at Chicago, in the county of Cook and State of Illinois, have invented certain new and useful Improvements in Rotary Engines, of which the following is a full, clear, and exact specification.

My invention relates to rotary engines, and more particularly to the multipiston class and that type of such class employing the movable form of abutment which is withdrawn to permit the piston to pass and then introduced into or across the steam-space as soon as practicable after the piston has proceeded beyond its plane of movement.

Although the art of rotary engines is very old, it is nevertheless acknowledged to be in an imperfect and impracticable state owing to many defects which have heretofore existed apparently as necessary evils in this type of engine. The most serious of these has been the necessity with prior constructions to exhaust and withdraw the abutment at a point where the piston has yet a large degree of its course to complete and the inability of such prior constructions to fully reinstall or introduce the abutment at substantially the instant it is cleared by the piston, thus on the one hand discharging the steam or other pressure before it has expended its maximum expansive force in propelling the piston and on the other hand leaving the piston without positive propelling power or pressure a great and serious length of time after it has passed the plane of the abutment movement.

Another serious defect of prior constructions has been the inability to keep the piston-shaft under positive rotating power or pressure throughout its complete rotation and at the same time utilize to a maximum degree the expansive force of the steam, without having the piston shell or cylinder of such extensive diameter as to make its use practically prohibitory.

My invention is mainly designed to overcome these defects; and it has for one of its important objects to cause the abutment to quickly return to its position behind the piston-head and across the steam-space the instant the piston-head has passed the plane of movement thereof.

Another object of my invention is to provide improved and effective means for very rapidly withdrawing the abutment to permit the piston-head to pass, whereby the engine may be run at a higher rate of speed than heretofore and the abutment at the same time allowed to remain in its effective position across the steam-space until the expansive force of the charge of steam propelling it has been utilized to the maximum degree.

Another object of my invention is to provide improved means whereby the abutment is actuated to recede from and enter the steam-space at such time only when it is free from pressure, thereby avoiding excessive friction and enabling the easy and punctual operation of the abutment.

Another object of my invention is to withdraw the abutment by positive means having operative connection with the piston and acting in unison therewith, and to instantly return the abutment at the proper period by means acting independently of the piston.

A further object of my invention is to provide a multipiston-engine in which both sets of valves for each piston may be reset or reversed, and the time of operation of the abutment accordingly varied, by one and the same movement.

A still further object of my invention is to provide improved and simple means for varying the time of closing of the admission-valve whereby the speed of the engine is automatically regulated; and a still further object of my invention is to provide the shell in which the piston-head is housed with a removable section for affording access to the interior thereof, and at the same time have the construction such as to permit of the entire shell, including such section, being provided with a continuous steam-jacket.

Other objects of minor importance will hereinafter appear.

With these ends in view my invention consists in certain features of novelty in the construction, combination, and arrangement of parts hereinafter described, shown in the accompanying drawings, and particularly pointed out in the claims.

Figure 2:
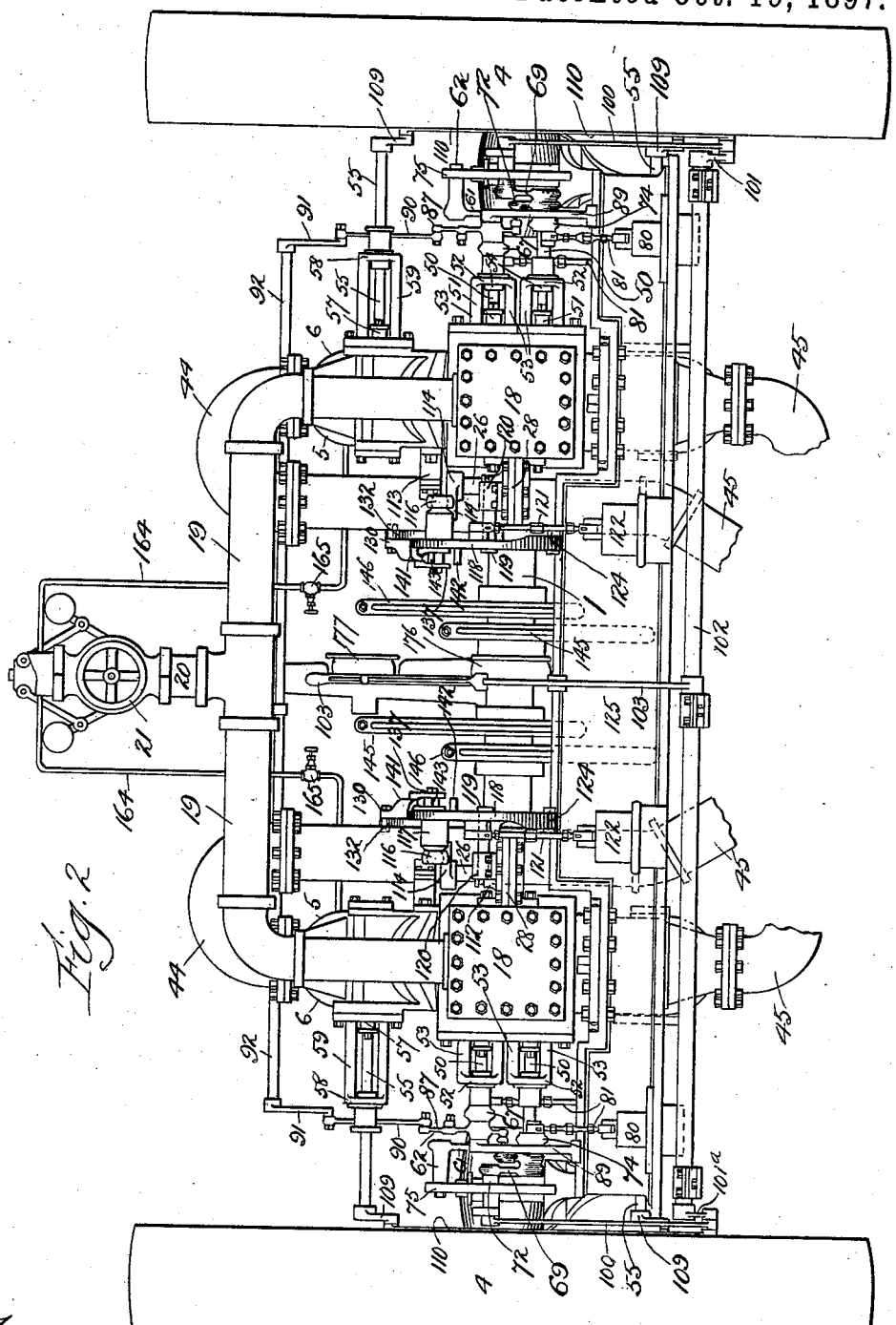
Figure 3:
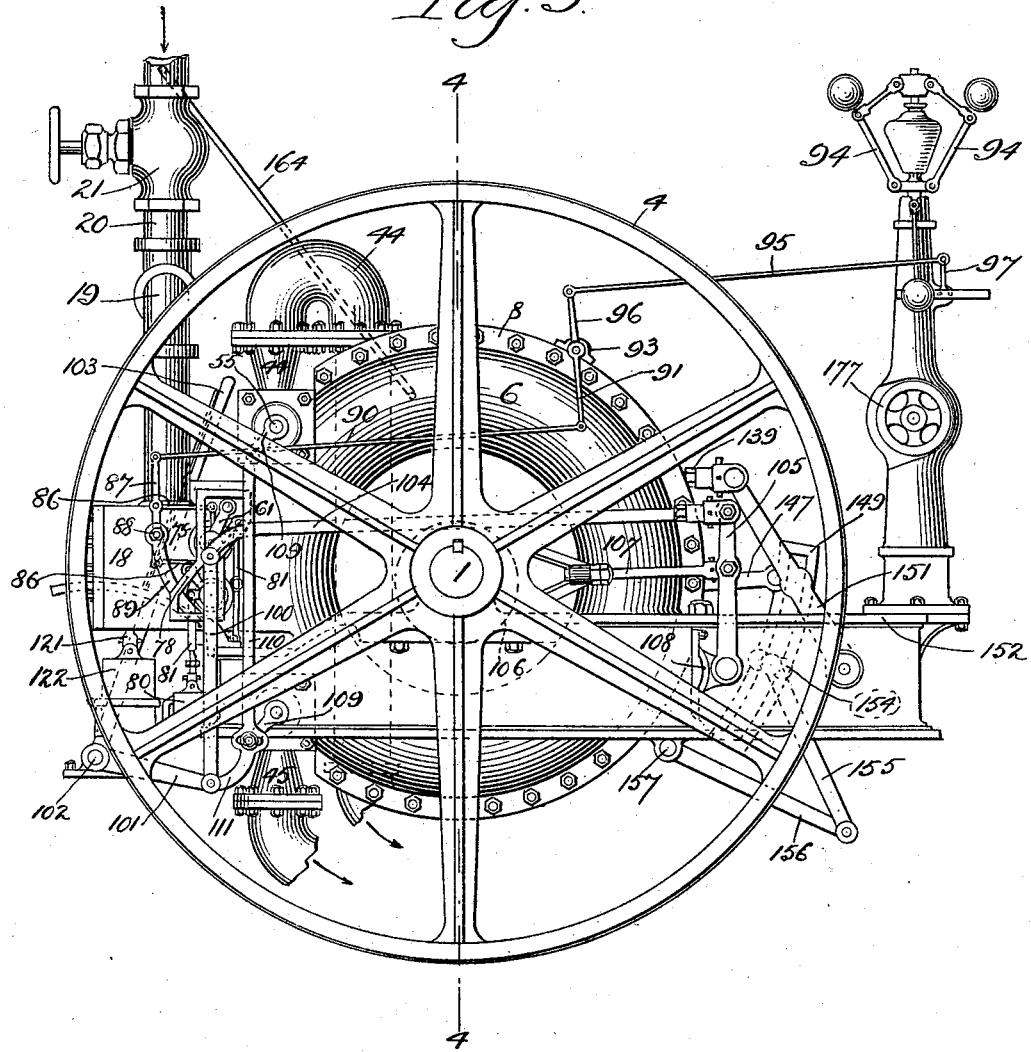

In the said drawings, Figure 1 is a general plan view of my improved engine. Fig. 2 is a front elevation thereof, looking from the engineer's post. Fig. 3 is an end or side elevation looking from the right in Figs. 1 and 2. Fig. 3ª is an enlarged detail view of the valve-gear, showing it as in Fig. 3. Fig. 4 is a vertical longitudinal section taken lengthwise of the main shaft, on the line 4 4, Fig. 3, and looking from the right in Fig. 3. Fig. 4ª is an enlarged detail section taken on same line. Fig. 5 is a detail vertical section of one of the piston-shells and parts contained therein, taken on the line 5 5, Fig. 4. Fig. 6 is a detail sectional view of the piston-head, taken on the line 6 6, Fig. 5, on a slightly-enlarged scale. Fig. 7 is a side elevation thereof. Fig. 8 is a detail plan view of the abutment, a portion of the shell in which the abutment is housed being shown in section. Fig. 9 is a detail edge view of the abutment. Fig. 9ª is an enlarged sectional view taken on the line 9 9, Fig. 8. Fig. 9ᵇ is an enlarged sectional view taken concentrically with the abutment and through the packing-rings a. Fig. 10 is a detail side elevation of one of the piston-shells and connected parts, partly broken away and partly shown in vertical section transversely of the main shaft, illustrating the removable section of the shell in position. Fig. 11 is a side elevation of one of the piston-shells, showing the removable section thereof removed and the piston-head exposed through the opening. Fig. 12 is a detail face view of the removable section of the piston-shell. Fig. 13 is an edge view thereof. Fig. 14 is a face or side view of the packing seated in the face of the removable section. Fig. 15 is an edge view thereof. Fig. 16 is a detail side elevation of the mechanism for withdrawing the abutment, shown on an enlarged scale. Fig. 17 is a plan view thereof, showing a portion of the abutment. Fig. 18 is a detail view showing the pull-rod, hereinafter described, for operating the abutment in the act of raising the latch or lock which holds the abutment against premature withdrawal. Fig. 19 is a similar view showing the lock raised and the pull-rod in engagement with the catch which coöperates with said rod to effect the withdrawal of the abutment, as hereinafter described. Fig. 20 is a detail view of the lock, looking from the left in Fig. 19. Figs. 21 and 22 are respectively a side elevation and plan view of the catch. Figs. 23 and 24 are respectively a side elevation and a plan of the end of the sleeve through which the reciprocating pull-rod operates. Fig. 25 is a detail side elevation of the end of the pull-rod. Fig. 26 is a cross-section of one of the admission-valves, taken on the line 26 26, Fig. 27. Fig. 27 is a side elevation thereof. Fig. 28 is a side elevation of the valve-stem detached, showing the means of connecting it with the valve. Fig. 29 is a view of the valve shown in Fig. 27, looking at right angles to the view in such figure. Fig. 30 is a top view of the valve-stem shown in Fig. 28. Fig. 31 is a cross-section of one of the exhaust-valves, taken on the line 31 31, Fig. 32. Fig. 32 is a side elevation thereof. Fig. 33 is a detail side elevation of the valve-gear link for operating the admission-valves, also showing certain portions coöperating therewith. Fig. 34 is a similar view showing the link in a different position ready to operate the lower valve. Fig. 35 is a detail view of the link detached. Fig. 36 is a plan cross-section of the link, taken on the line 36 36, Fig. 35. Fig. 37 is a front elevation looking toward the edge of the link, showing its operative relation to the portions which actuate the admission-valves. Fig. 38 is an enlarged detail view of certain crank-arms and a cam which effect the oscillation of the valve and govern the time of closing thereof. Fig. 39 is a similar view showing the parts in a different position. Fig. 40 is a side elevation thereof, looking from the right-hand side in Fig. 9. Fig. 41 is a detail view showing in side elevation the crank-arm to which the dashpot rod is connected for closing the admission-valve. Fig. 42 is a plan view thereof; and Fig. 43 is a detail edge view of the valve-tripping cam, hereinafter described.

Like signs of reference indicate like parts throughout the several views.

To gain in a maximum degree the advantages of my improvements, it is essential that they be embodied in the form of a multipiston-engine having a separate shell or steam piston-space for each piston, but it will nevertheless be understood that certain features of my invention, as indicated by the claims hereinafter, are useful in a single engine or engine having but one piston and shell or cylinder.

1 represents the main shaft of the engine, which is journaled at its opposite ends in suitable journal-boxes 2, mounted upon portions 3 of the main frame. Each of the shells in which the pistons are housed and work is mounted upon a portion 4 of the main frame and is preferably composed of two portions 5 6, having peripheral flanges 7 8, bolted or otherwise secured together, so as to form an annular steam-space 9 in which the piston-head works. These sections 7 8 of the shell are each provided with a suitable stuffing-box 10, through which the shaft 1 passes, and mounted upon and keyed to the shaft 1 in each of the shells is a piston-disk 11, provided with an arm or projection 12, to which the piston-head, presently to be described, is secured. As shown more clearly in Fig. 4, this disk 11 is snugly housed between those portions of the shell members 7 8 that are bounded by the annular steam-space 9, which are brought together against the disk 11 and are each provided in their opposed faces with an annular recess 13ª, in which are formed a number of annular grooves 13, which completely surround the shaft 1 and in each of which is located a suitable packing-ring 14, capable of adjustment from the exterior by means of a set-screw 15. In order that the waters of condensation may be withdrawn from the annular spaces thus formed between the projecting rings 14, each of the latter is connected by a short tube 16 (see Fig. 4ª) with a blow-off cock 17.

18 represents a steam-chest which is suitably secured to each of the piston-shells, and to each of which chests extends a branch supply-pipe 19, communicating at its upper end with a common supply-pipe 20, in which the throttle-valve 21 is located for regulating the supply of steam to both steam-chests simultaneously. Each of these steam-chests is also provided with a cell 22, into which the movable abutment 23 is retracted when being withdrawn to permit the piston-head to pass. This cell 22 is in communication with a slit 24, extending through the side of the shell and being of slightly-larger diameter than the interior of the steam-space 9, so as to provide a seat or shoulder around the inside of the steam-space for the abutment 23, as more clearly shown in Fig. 8. The abutment 23 is provided with a stem or arm 25, which is secured to a short shaft or pivot 26, and this stem is housed in a supplemental box 27, secured to the side of the chest 18 and having an enlargement 28, which communicates with the cell 22, so as to permit the abutment to swing outwardly clear of the steam-space 9. This box 27 and its enlargement 28, however, are made separately from the chest 18 and of less vertical thickness simply for the sake of saving material, and it is of course evident that the chest 18 and the cell 22 may be made to accomplish the desired object without the special form of box 27 28 just described.

The piston-head, as before described, is secured to the arm 12 of the piston-disk 11, and it preferably consists of a block 29, fitted over the arm 12 and being embraced by a pair of face-plates 30, between which are located a number of packing-rings 31, surrounding a ring 32, a bolt 33 being passed through the plates 30, block 29, and arm 12 for binding the parts snugly together. In order that the packing-rings 31 may be adjusted and held firmly in contact with the surface of the steam-space 9, the block 29 is provided with a number of cut-away places 34, as more clearly shown in Fig. 6, in each of which is arranged a bow-spring 35, which presses normally against the inner side of the ring 32 and forces it outward and is provided with a set-screw 36, secured in the block 29, whereby the tension of the springs may be regulated. If desired, the face-plates 30 and block 29 may also be bound together for additional security by means of bolts 37.

On each side of the abutment 23 is formed a complete set of inlet and exhaust ports for the steam-space 9. The supply and exhaust ports above the abutment are shown at 38 39, respectively, and below it at 40 41, respectively. Each of the exhaust-ports is provided with a valve, one of which is closed when the other is open by automatic means hereinafter described. The valve of the upper exhaust-port is shown at 42 and of the lower exhaust-port at 43. These exhaust-ports may if desired be respectively connected to pipes 44 45, which on both engines lead to a common discharge-pipe (not shown) arranged at any convenient place.

The inlet-port 38 is provided with a valve 46 and the inlet-port 40 with a valve 47, and mechanism, which I shall presently describe, is provided whereby the exhaust-ports are alternately opened and closed as the engine is reversed and one of the inlet-ports is closed and rendered inactive while the other alternately opens and closes to supply and shut off the steam to the steam-space 9. These supply and exhaust valves are preferably of the rotary type and elongated longitudinally, so as to guard long narrow ports. Each of the exhaust-valves 42 43 is provided with a cylindrical face which seats outwardly, so that the pressure in the steam-space 9 will decrease the liability to leakage, while the supply-valves 46 47 are provided with cylindrical faces which seat inwardly, so as to be held to their seats by the pressure of the steam in the steam-chest 18. Each of the valves 46 47 is provided in one end with a slot or socket 48, in which is fitted a head 49 on each of the valve-stems 50, so that the rotation of the stem will be imparted to the valve. Each of the valve-stems 50 passes through a suitable stuffing-box 51 (see Fig. 2) on the side of the steam-chest and then through a bonnet supported on the side of the steam-chest and comprising a pair of arms 53, and bearing 52 for the purpose of supporting the outer end of the valve-stem, which is considerably elongated for the sake of connecting it with the valve-operating mechanism. Each of the valve-stems is held against longitudinal movement by means of a collar 54, abutting against the inner side of the bearing 52.

Each of the exhaust-valves 42 43 is provided with a valve-stem 55 56, respectively, which is connected to its valve by means of a head like the head 49 and a socket like the socket 48, already described with reference to the inlet-valves, and each is surrounded by a stuffing-box 57 and supported at its outer end by a bonnet comprising bearing 58, which is secured to the side of the steam-shell by means of arms 59, the valve-stems 55 56 being held against longitudinal movement by means of collars 60, secured thereon and abutting against the inner faces of the bearings 58.

Mounted loosely or independently rotatably upon the outer end of each of the supply-valve stems 50 is a bell-crank lever. One arm 61 of the said bell-crank on the upper one of said valve-stems is provided with a stud or lug 62, while the other arm 63 carries a pivoted spring-actuated dog or pawl 64, having a hook 65, adapted to engage a tooth 66, carried on one side of a crank-arm 67, which is rigidly secured to the upper valve-stem 50, so that by the oscillation of the bell-crank arms 61 63 the valve-stem 50 may be rotated through the intermediary of the spring pawl or dog 64, the spring 68 of such dog or pawl being arranged to normally hold the dog in engagement with the tooth 66, and when so oscillated to permit the pressure to enter the steam-space 9 as long as the supply-valve 46 is thus held open. The said bell-crank lever on the lower valve-stem 50 also has one of its arms, the arm 69, provided with a lug 70 similar to the lug 62, while its other arm 71 carries a pivoted dog or pawl 72 similar to the dog 64 and having a tooth engaging with a lug or tooth 73, carried by a crank-arm 74 like the crank-arm 67, fixed to the lower valve-stem 50.

In order that either of the bell-cranks on the valve-stems 50 may be oscillated according to the direction in which it is desired to run the engine, I employ a valve-gear having a link of a peculiar form which I will now describe. This link and its relation to the parts connected with the valve-stems 50 are more clearly shown in Fig. 3$^a$ and may be designated generally by the numeral 75. It is provided at its mid-length with a contracted passage which is adapted to be raised or lowered into engagement with one or the other of the studs 62 70, each of which is provided with a flanged head 76, whereby the stud may better remain in place and the liability of the link pulling off of the stud avoided. When the stud is in this contracted passage and the link 75 oscillated or moved back and forth, the bell-crank lever carrying such stud will cause the supply-valve to which that bell-crank has operative connection to open and admit steam between the abutment and the piston-head and to remain open as long as the dog 64 or 72 is in engagement with the tooth 66 or 73. When one of the studs 62 70 is being thus embraced by the centrally-located contracted portion of the link 75, and the valve to which it is operatively connected is being thus operated, the other one of the supply-valves is of course at rest; and in order that the studs 62 or 70 by which the latter valve is operated may stand clear of any moving part of the link 75 capable of imparting oscillation to the stud I provide the link at opposite ends with the widened or diverging portions clearly shown in Fig. 3$^a$. The bell-crank arm 61 which carries the stud 62 remains in the position shown in Fig. 3$^a$ when the upper supply-valve 46 is closed and at rest. If now the link should be moved to the right, as viewed in Fig. 3$^a$, the lower supply-valve would be opened owing to the oscillation of the arm 69 and the upward pull of the dog 72 on the arm 74, but the stud 62 would not be molested because of the space between such stud and the upright side of the link. If, however, it should be desired to run the engine in the opposite direction and the link 75 should be elevated a sufficient distance, which is accomplished by the act of reversing the engine, an inclined or diverging side 77 of the link 75 would come against the under side of the stud 62 and, crowding the arm 61 over to the left and into a more upright position, would cause the upper supply-valve 46 to open, the stud 62 at the completion of the upward movement of the link 75 being situated with respect to the link where the stud 70 is now shown in Fig. 3$^a$. In the meanwhile a diverging or inclining side 78 of the link 75 will have permitted the arm 69 to fall to the left as the stud 70 comes down such incline 78 and in so falling permit the lower supply-valve 47 to close. By thus forming the link 75 it will be seen that I provide means whereby the reversal of the engine automatically gathers the supply-valves to the positions which they are intended to occupy during the subsequent running of the engine in that direction.

Each of the supply-valves 46 47 is preferably closed by means acting independently of the means just described for opening it, and as an effective and simple means for this purpose I employ for each of the valves a dash-pot 79 80, respectively, the former being connected by rod 81 to the side of arm 67 opposite to that on which the tooth or lug 66 is situated, (see Fig. 41,) while the dash-pot 80 is connected by a similar rod 81 to the arm 74, so that as soon as the arm 67 or 74 is released by the dog 64 or 72 the dash-pot will cause the valve to instantly close. In order now that the time of closing of the supply-valve in operation may be varied or governed in accordance with the speed of the engine, I locate upon each of the valve-stems 50 a cam 82, (see Figs. 38 to 40,) which is provided with an arm 83. This cam 82 on the upper valve-stem 50 is adapted to bear against an arm or projection 84 on the dog 64, so that when the cam is rotated on the stem 50 it will crowd the dog 64 out of engagement with the tooth 66 and permit the dash-pot 79 to close the upper supply-valve 46. The lower one of the cams 82 is adapted to bear against a similar projection 85 on the dog or pawl 72, and thus when rotated crowd the dog 72 out of engagement with the tooth 73 and permit the dash-pot 80 to instantly close the lower valve 47. These arms 83 are respectively connected by two horizontal rods 86 to opposite ends of a lever 87, which is fulcrumed at 88 on a standard 89, between the points of connection with the arms 86, and its upper end is connected by a rod 90 to a crank-arm 91 on a rocker-shaft 92, journaled in box 93 on each of the piston-shells and extending athwart the engine, so that its oscillation will affect the valve mechanism on both sides alike, it being of course understood without detail description that the valve mechanism and other parts described with reference to one of the piston-shells and pistons, or, in other words, with reference to one side of the engine, are duplicated on the other side. This rocker-shaft 92 is rotated or rocked more or less, according to the speed and load of the engine, by suitable connection with a common or any suitable form of governor 94, the connection shown consisting of a rod 95, secured to a crank-arm 96 on the shaft 92 at one end and at its other end to a lever 97, suitably connected to the governor. Thus it will be seen that when centrifugal force carries the governor-weights outwardly and oscillates the lever 87 to the left the lower one of the rods 86 will be pulled to the left, as viewed in Fig. 3ᵃ, and the lower supply-valve 47 will consequently be permitted to close, as before described, if the dog 72 should be at that time in the act of raising the arm 74. On the other hand should the contracted portion of the link 75 be in engagement with the upper stud 62, the movement of the rod 86 to the right would have the effect of throwing the dog 64 out of engagement with the tooth 66 and permitting the dash-pot 79 to close the valve 46 should it at that time be held open by the pawl 64. This simultaneous opposite movement of the rods 86 and arms 83 is, it will be seen, incidental to the arrangement of the arms 67 74, through the medium of which the supply-valves are opened and closed, it being desirable to set such arms to opposite sides of the valve-stems 50, as shown in Fig. 3ᵃ, and consequently to employ a corresponding arrangement of the bell-crank levers and cams located upon the stems 50.

The link 75 is provided on one side with a yoke 98, which straddles the narrowed or contracted portion thereof, as more clearly shown in Fig. 36, and is provided with an opening 99 for the passage of the flanged heads 76 of the studs 72 70. This yoke 98 is secured to the upper end of a supporting-rod 100, whose lower end is pivoted to one end of a crank-arm 101, secured on a rocker-shaft 102, extending athwart the machine and being connected at its opposite end to a crank-arm 101ᵃ, which, like the crank-arm 101, supports the link-supporting rod 100 at the opposite side of the engine. This rocker-shaft 102 at a point convenient to the engineer's post is provided with a reversing-lever 103, whereby the oscillation of the lever will raise or lower both links 75 at opposite sides of the engine. The links 75 are given their backward-and-forward movement by means of connecting-rods 104, pivoted to the yoke 98 on each of the links 75 at one end and at their other ends to levers 105, each of which latter derives its oscillation from an eccentric 106, arranged at each end of the main shaft 1 and having its strap connected by rod 107 with the lever 105, each of the latter being pivoted at 108 to a portion of the main frame.

In order that the exhaust-valves 42 43 above and below the abutment on each engine or on each side of the engine may be alternately opened and closed as the engine is reversed—that is to say, in order that the valve above the abutment for instance may be closed when the exhaust-valve below the abutment is opened—I provide each of the valve-stems 55 56 with a crank 109 and connect such crank-arms together by means of a connecting-rod 110, whose lower end is provided with a projection 111, secured to the arm 101 at one end of the shaft 102 and to the arm 101ᵃ at the opposite end of such shaft 102, so that by the movement of the reversing-lever 103 the links 75 on both sides of the engine and the crank-arms 109 will be simultaneously raised and lowered, whereby one of the supply-valves on each side of the engine is rendered active and the other inactive and one of the exhaust-valves is opened while the other is closed on each side of the engine, and all this by one and the same movement of the reversing-lever 103. In order that the lower end of the connecting-rod 110 may move with the crank-arms 101 101ᵃ in a direction contrary to the movement of the crank 109, the connection between the lower crank 109 and the lower end of the rod 110 is slotted.

I will now describe the means whereby the abutment 23 is rapidly withdrawn to permit the piston-head to pass, and instantly returned or reinstalled behind the piston immediately after the piston has passed beyond its plane of movement. The upright shaft 26, to which the abutment-arm 25 is secured, extends through a suitable stuffing-box 112 on the upper side of the box or chamber 27 and has its upper end journaled in a supporting-bracket 113, between which latter and the box 112 is situated a crank-arm 114, securely keyed to the shaft 26, as more clearly shown in Fig. 17. This crank 114 is provided with a ball-wrist 115, socketed in one end of a pitman 116, whose other end is provided with a socket receiving a ball-wrist 117 on a rotary portion having, preferably, the form of a disk 118, so that by the rotation of the latter the crank-arm 114 is oscillated and the abutment 23 consequently withdrawn from or inserted into the steam-space 9, the ball-wrists 115 117 providing for the compound movement of the pitman 116, as will be understood. The disk 118 is mounted upon a shaft 119, which in turn is mounted in a suitable support or box 120, secured to the upper side of the portion 28; and to one side of the disk 118 is pivoted a rod 121, which extends downwardly to and is operated by a dash-pot 122, the latter exerting a normal tendency to rotate the disk to the right or downwardly independently of the positively-operating parts of the engine, and consequently serving to instantly return the abutment 23 to its position immediately behind the piston-head when the disk 118 is not under the control of other agencies. In order that the inward or returning movement of the abutment may be limited and the abutment prevented from striking into its seat or socket in the steam-space with undue force, I provide the periphery of the disk 118 with a shoulder 123, which, when the abutment has reached the limit of its movement, comes into engagement with a fixed stop 124, supported upon the main frame at 125. One side of the abutment is also provided with an independently-movable packing-block 126, having a flat stem 126ᵃ fitted in a suitable socket therein, as shown more clearly in Figs. 8 to 9ᵃ, and being pressed normally outward by suitable springs or cushions 127, as will be understood. This packing-block 126 is of sufficient dimensions to completely fill the groove 128, constituted by the periphery of the piston-disk 11 and the sides of the members 7 8 of the shell, and thus serving at once to prevent the escape of steam past the abutment while avoiding any undue shock that might be occasioned by the insertion of the abutment, even in the absence of the stop 123 124.

In order that the abutment may be rendered absolutely steam-tight as it rests upon its seat within the steam-space 9, I provide both its upper and lower edges with a packing-ring $a$, which completely surrounds it, as shown in Figs. 8 to 9ᵇ. Each of these packing-rings $a$ is seated in a groove (shown in Fig. 9ᵃ) and is pressed normally away or outward from the abutment by means of springs or other cushions $b$, interposed at suitable intervals between the packing-rings, the grooves in which the rings are seated being counterbored from side to side of the abutment for the accommodation of the springs $b$.

The rings $a$ are held from accidental dislodgment from the grooves by screws $c$, having their ends threaded in the abutment and their heads seated in the rings with the requisite play. The rings $a$ pass on either side of the flat stem 126ᵃ, while the broadened head of the packing 126 overlaps the rings, as clearly shown in Fig. 9ᵃ. By this means it will be seen that the abutment is always steam-tight and any pressure tending to compress the packing-ring on one side will permit the springs $b$ to force the ring on the other side outward against the abutment-seat, and as the abutment never leaves the narrow slit in which it fits the rings $a$, even though normally projecting beyond the plane of the abutment, can never catch on the edge of the abutment-seat.

In order that the abutment may not be prematurely withdrawn or displaced, the disk 118 is provided with a second shoulder or notch 129, with which engages a locking dog or pawl 130 as soon as the abutment has reached the extremity of its inward movement, such dog or pawl 130 being pivoted at 131 to a supporting-arm 132 and falling by gravity into engagement with the shoulder 129, and the edge of the disk 118 between the shoulder 129 being smooth or plain, so that when the dog or pawl 130 is elevated and the disk rotated toward it it will rest upon such plain edge, which will slide thereunder until the shoulder 129 and pawl 130 coincide. One side of the disk 118 is provided with a pivot-pin 133, upon which is pivoted a catch 134. This catch is straddled by a bifurcated end 135 of a sleeve 136, which end is provided with downwardly-projecting ears 137, having vertically-elongated slots 138, through which the pivot 133 passes, the slots 138 being of sufficient size to permit the sleeve 136 to rise and fall. Reciprocating within the sleeve 136 is a pull-rod 139, whose inserted extremity is beveled preferably at top and bottom, as more clearly shown in Fig. 25, and provided near by and on its under side with a hook or tooth 140, which, when the rod 139 has been inserted into the sleeve 136 to a sufficient extent, comes into engagement with the pivoted catch 134 and thus hitches itself to the disk 118. At the same time and by the same movement the upper bevel on the rod 139 engages under a depending lip 141 on the dog or pawl 130 and thereby lifts such dog out of engagement with the shoulder 129 and leaves the disk 118 free to be rotated by the rod 139 when the latter is pulled in the opposite direction, as clearly shown in Fig. 18. When the rod 139 is pulled to the left, as viewed in Fig. 16, the abutment is rapidly withdrawn from its position across the steam-space. By the time the piston-head has cleared the abutment or past its plane of movement a lug or trip 142, secured to the side of the disk 118, comes into engagement with the under side of a projection 143, extending from the forward or right-hand end of the catch 134, and as the disk 118 continues to rotate this trip 142 gradually crowds the projection 143 upwardly with respect to the rod 139, while the pivot-pin 133 at this time is moved downwardly, and consequently the hook 140 is soon disengaged with the catch 134, the vertically-elongated slots 138 of the ears 37 in the meanwhile permitting the supporting-sleeve 136 to rise with relation to the pivot-pin 133. The instant the hook 140 disengages the catch 134 the dash-pot 122 returns the disk 118 to its normal position and quickly and at the same time reinstalls the abutment. The catch 134 is provided at its opposite end with an elongation or projection 144, which comes against the under side of the sleeve 136 and thus limits the independent rotation of the catch 134 to the right and holds it normally in position to be engaged by the hook 140. By this means it will be seen that a comparatively slow movement of the disk 118 at its periphery will result in a very rapid movement of the abutment 23, inasmuch as the peripheral movement of the disk 118 is multiplied in the abutment by reason of the comparatively short crank-arm 114 and long arm 25. Hence it is also seen that by causing the reciprocating rod 139 to engage the catch 134 at or about the time the movement of the rod reverses it will engage the catch without shock or jar, and the abutment will be very rapidly and almost instantly thrown out of the steam-space without the clash and shock heretofore occasioned in attempts to accomplish this by the sudden engagement of rapidly-moving parts. As a result of this construction, therefore, I am enabled to permit the abutment to remain in place a much longer time and thus utilize the expansive force of the steam to a far greater degree than has heretofore been possible, because the abutment may remain in place until barely time to remove it to permit the piston-head to pass without the necessity of making allowance for the engaging parts by which the abutment was heretofore removed to come into harmony of movement without shock or jar. In short it is evident that with the construction which I have described the engagement of the reciprocating pull-rod 139 with the catch 134, if made at substantially the instant of the change in direction of movement of the rod, cannot result in material shock or jar, however rapidly the rod may be moving, and therefore it is possible to move the abutment even more rapidly than the travel of the piston and yet permit the abutment to remain in its full effective position until an exceedingly short space of time before the piston-head will have reached the opposite side of the abutment plane of movement.

The reciprocating pull-rod 139 has a much greater movement than is required for the mere oscillation of the disk 118, and in order that its end may not project beyond the catch 134 and place the engineer in danger of injury the sleeve 136 is employed to support the hook end of the rod, while the rod in turn supports the end of the sleeve. This rod 139 is reciprocated by some positively-moving part of the engine, and a part whereby the time of withdrawal of the abutment may be varied when the engine is reversed, it being of course understood that if the piston-head should start from the position shown in Fig. 11—for instance, to the left—the abutment would have to be removed to permit the piston-head to pass at a different time with respect to the movement of the piston-head from the time at which it would be removed should the piston-head start from such position and revolve to the right. As a convenient and effective means for accomplishing this variable reciprocation of the rod 139 I prefer to employ an ordinary link mechanism, which I will now describe. The usual eccentrics of such link mechanism are shown at 145 146, respectively, and mounted upon the main shaft 1. Their straps are provided, respectively, with eccentric-rods 147 148, which, as usual, are connected to opposite ends of the link 149. The reciprocating rod 139 is pivoted to the upper end of a lever 150, whose lower end is fulcrumed at 151 to the portion 152 of the main frame and is provided at an intermediate point with a stud or block 153, which engages in the link 149 and which imparts the oscillation of the link to the pull-rod 139. The link 149 is provided on one side with a yoke 154, which straddles the two sides of the link, as will be understood, and to which is pivoted an arm 155. This in turn is pivoted to the lower end of a crank-arm 156, whose upper end is secured to a rock-shaft 157. (See Fig. 1.) The lower end of this crank-arm 156 is connected to the arm 155 by being secured to a short shaft 158, to which is secured the arm 159, arranged on the opposite side of the engine and corresponding with the arm 155, the arm 156, however, serving for the oscillation of both arms 155 159 simultaneously. As shown in Fig. 1, the rocker-shaft 157 is provided with an upwardly-projecting crank-arm 160, to which is pivoted one end of a connecting-rod 161, whose other end is attached to the reversing-lever 103, so that by the movement of the reversing-lever the links 149 on opposite sides of the engine will be raised and lowered. In the position shown in Fig. 3 the stud or block 153 is in line with the eccentric-rod 147 and is consequently in position to impart the movement of eccentric 145 to the pull-rod 139. Should the engine be reversed, the link 149 would be raised and the stud 153 would then be in line with the lower eccentric-rod 148, which latter would then actuate the pull-rod 139, while the other eccentric 145 would have no effect upon the rod 139. Should the link 149 be raised half-way, it would simply oscillate upon the block 153 and the rod 139 would consequently remain at rest, as usual, in the operation of link mechanism. By this means the abutment is withdrawn sooner or later with respect to the movement of the piston-head, accordingly as the engine is started in one direction or the other. The eccentrics 145 146 are so set with respect to the stroke of the rod 139, however, that they will begin their rapid movement at about the time the hook 140 of the rod 139 coincides with the catch 134, so that the full movement of the eccentrics may be imparted to the abutment substantially at the instant the withdrawing movement of the abutment commences. Thus it is seen that not only are the inlet and exhaust valves of both sides of the engine reset or readjusted to the proper positions by one and the same reversing device, but the times of withdrawal of both abutments are also varied with respect to the travel of the piston-heads and with respect to and in unison with the alteration in the positions of the exhaust and inlet valves.

Each of the piston-disks 11 is provided with but a single piston-head, as is evident from the drawings, but these piston-heads are set "on the half" with relation to each other, so that when one is acting under the expansive force alone of the steam, the supply having been cut off by the supply-valve 46, the other will be taking steam and acting under the combined expansive and storage pressures. In this manner and by the employment of the improvements described, whereby the abutment may be allowed to remain a much greater length of time than heretofore and instantly return without loss of time after it is cleared by the piston-head, I am enabled to shut off the supply and run by expansion throughout a greater degree of the circle than has heretofore been practicable, and consequently, as I have before stated, utilize the expansive force of the steam to a maximum degree. Should both pistons be located in a single shell of sufficient diameter to utilize on each piston the full expansive force of the steam before exhausting, the shell would be of such great magnitude or diameter as to render its use prohibitory for practical purposes.

Each of the piston-shells is provided with a continuous steam-jacket. This may be formed by constituting in each half of each shell a cell or space 162, which completely surround the shells and are provided in the meeting faces of the sections 7 8 with crossover-passages 163, as shown in Fig. 5, whereby the steam may pass from one section of the shell to the other. The purpose of this steam-jacket is to thoroughly warm or heat the engine before the steam-supply is turned on for running it, so that the maximum expansion of the parts may be attained at the outset; and in order that this continuous steam-jacket may receive steam irrespective of the supply to the engine itself I provide a separate pipe 164, which leads from the main supply-pipe 20 between the source of supply and the throttle 21 down to and is connected with each of the shells and is provided with a cock 165, whereby the supply to the jackets may be shut off when desired. Each of these jackets 162 may be drained of water of condensation through a suitable blow-off 166, and the piston-space 9 may also be drained by a similar blow-off 167.

In order that the piston-head may be readily accessible without the necessity of taking the shell-sections 7 8 apart, I provide each of the shells or one of their halves on one side of the piston-space 9 with a removable section 168, having suitable flanges 169 and an embedded packing 170, whereby the section is firmly and hermetically secured in place, a number of bolts being passed through the flanges 169 into depressed flanges 172 on the main portion of the shell. This removable section, like the main portion of the shell, is provided with a part of the steam-jacket, and in order that the steam may enter this part and circulate therethrough the face of the section 168 is provided with a crossover-passage 173, which registers with a similar passage 174 in the face or flange of the opposite half of the shell. This removable section is also provided with a blow-off 175 for draining the steam-jacket therein of water of condensation.

176 is a pulley located on the main shaft between the two sets of eccentrics 145 146 and connected by a suitable belt (omitted for the sake of clearness) with a pulley 177, which drives the governor.

Having thus described my invention, what I claim as new therein, and desire to secure by Letters Patent, is—

1. A rotary engine having in combination a revoluble piston-head, a steam-space therefor, a movable abutment, an exhaust-port on each side of said abutment, an inlet-port between each of said exhaust-ports and abutment, means for closing one of said exhausts when the other is open, a valve for controlling each of said inlet-ports and a valve-gear having means of operative temporary connection with both of said valves alternately but not simultaneously whereby one of said inlet-valves remains at rest while the other is active, substantially as set forth.

2. A rotary engine having in combination a revoluble piston-head; a steam-space therefor having inlet and exhaust ports; a movable abutment; a member movable back and forth; means for moving said member back and forth having operative relation to said piston; means having operative connection with said abutment located at substantially the extremity of the stroke of said member and adapted to be engaged by said member for withdrawing said abutment, and means for returning said abutment, substantially as set forth.

3. A rotary engine having in combination a revoluble piston-head; a steam-space therefor having inlet and exhaust ports; a movable abutment; a reciprocating member having operative connection with said piston; means having operative connection with said abutment and being located at the extremity of the stroke of said reciprocating member and adapted to be engaged thereby for withdrawing said abutment; a trip for automatically releasing said means from its connection with said reciprocating member, and means for returning said abutment, substantially as set forth.

4. A rotary engine having in combination a revoluble piston-head, a steam-space therefor having inlet and exhaust ports, a movable abutment, positive means of operation connected with said piston for withdrawing said abutment, a trip for releasing said means from its connection with the abutment, means operating independently of the piston for instantly returning the abutment, and an automatic lock for holding the abutment from premature withdrawal, substantially as set forth.

5. A rotary engine having in combination a revoluble piston-head, a steam-space therefor having an exhaust-port and an admission-valve; means operatively and positively connected with the piston for opening said valve, a governor for releasing the valve from its operative connection with the piston; means acting independently of said piston for closing the valve; a movable abutment; means for withdrawing said abutment coöperatively connected with said valve-opening means; and means acting independently of the piston and of said valve-opening mechanism for returning said abutment, substantially as set forth.

6. A rotary engine having in combination a revoluble piston-head; a steam-space therefor having an exhaust-port and an admission-valve; means operatively and positively connected with the piston for opening said valve; a governor for releasing said valve from its operative connection with said piston; means acting independently of the piston for closing said valve; a movable abutment; means for withdrawing said abutment, coöperatively connected with said valve-opening means; and means acting independently of said piston and of said valve-opening means and exerting a continual tendency to return said abutment to a position across the steam-space, substantially as set forth.

7. A rotary engine having in combination a movable abutment, a revoluble piston-head; a steam-space therefor having a valved exhaust-port and an inlet-valve on each side of said abutment; a valve-gear for opening said inlet-valves having operative connection with said piston; a reversing device having connection with the exhaust-valves for alternately opening and closing them respectively and also having operative connection with said valve-gear for alternately bringing the valve-gear into active and inactive relation to the inlet-valves; said valve-gear being without permanent connection with either of said inlet-valves and means for operating said abutment, substantially as set forth.

8. A rotary engine having in combination a pair of revoluble piston-heads connected together and set at different degrees of the circle which they describe whereby one will receive direct pressure of steam while the other acts solely under the expansive force of the steam admitted behind it; an annular steam-space for each of said pistons each provided with an exhaust-port and an inlet-port; a valve for controlling each of said inlet-ports; means for alternately opening said inlet-valves; a movable abutment extending across each of said steam-spaces; oppositely-reciprocating members for alternately withdrawing said abutments, each of said members being provided with means for becoming detachably connected with one of said abutments and the last said means being located substantially at the extremities of the movements of said members respectively; and means for returning said abutments, substantially as set forth.

9. A rotary engine having in combination a revoluble piston-head; a steam-space therefor; a movable abutment; an inlet and an exhaust valve on both sides of said abutment; said inlet-valves being independent and disconnected; a valve-gear having a link arranged in operative relation to both inlet-valves for opening either of them; a second link operating in unison with the piston and having means of connection with said abutment for withdrawing it; and means for returning said abutment, substantially as set forth.

10. A rotary engine having in combination a revoluble piston-head; a steam-space therefor; a movable abutment; an inlet and an exhaust valve on both sides of said abutment; a valve-gear having a link arranged in operative relation to both of said inlet-valves for opening either of them; a second link operating in unison with the piston and having means of connection with said abutment for withdrawing it; said links being operatively connected together whereby they will shift in unison; and means for returning the abutment, substantially as set forth.

11. A rotary engine having in combination a revoluble piston-head; a steam-space therefor; a movable abutment; an inlet and an exhaust valve on both sides of said abutment; a valve-gear having a link arranged in operative relation to both of said inlet-valves for opening them; a second link operating in unison with said piston and having means of connection with said abutment for withdrawing it; a reversing-lever; a shaft to which said lever is secured; a crank-arm on said shaft; a rod pivoted to said crank-arm and supporting the link of said valve-gear; a second rock-shaft rotatively connected with said reversing-lever; a crank-arm secured on said second rock-shaft and supporting said second link, whereby said links will be shifted in unison; and means for returning said abutment, substantially as set forth.

12. A rotary engine having in combination a revoluble piston-head; a steam-space therefor; a movable abutment; an inlet and an exhaust valve on both sides of said abutment; said exhaust-valves being connected together whereby the opening of one will close the other; a valve-gear having a link arranged in operative relation to both inlet-valves for opening them; a second link operating in unison with the piston and having means of connection with said abutment for withdrawing it; said links being operatively connected together whereby they will shift in unison, and a reversing device having operative connection with said links and also with said exhaust-valves, substantially as set forth.

13. A rotary engine having in combination a revoluble piston-head; a steam-space therefor; a movable abutment; an inlet and an exhaust valve on both sides of said abutment; said exhaust-valves being provided with crank-arms; a rod connecting said crank-arms together whereby the opening of one exhaust-valve will close the other; a valve-gear having a link arranged in operative relation to both inlet-valves for opening them; a second link operating in unison with the piston and having means of connection with said abutment for withdrawing it; a rocker-shaft; a reversing device or lever secured to said shaft; a crank-arm on said rocker-shaft; a rod pivoted to said crank-arm and supporting said valve-gear link; the said rod which connects the crank-arms of the exhaust-valves being also pivoted to the crank-arm on said rocker-shaft; a second rocker-shaft operatively connected with said reversing device and having a crank-arm supporting said second link, substantially as set forth.

14. A rotary engine having in combination a revoluble piston; an abutment; an inlet-valve and exhaust-port on both sides of said abutment; a movable portion or lug having operative connection with each of said inlet-valves; and a valve-gear for opening said inlet-valves having a portion provided with a contraction adapted to engage with either of said movable portions or lugs and a diverging or inclined portion leading from said contraction, substantially as set forth.

15. A rotary engine having in combination a revoluble piston; a steam-space therefor; a movable abutment; an inlet-valve and exhaust-port on both sides of said abutment; a movable stud or lug having operative connection with each of said inlet-valves; and a valve-gear for opening said inlet-valves having a link provided with a contracted portion adapted to engage with either of said studs or lugs and a widened portion incapable of engagement with said studs or lugs, substantially as set forth.

16. A rotary engine having in combination a revoluble piston; a steam-space therefor; a movable abutment; an inlet-valve and an exhaust-port on both sides of said abutment; a crank-arm on each valve-stem of said inlet-valves, having a stud or lug; a valve-gear for opening said inlet-valves having a link provided with a contracted portion adapted to engage with either of said studs or lugs and a widened portion incapable of engaging with said studs or lugs, substantially as set forth.

17. A rotary engine having in combination a revoluble piston; a steam-space therefor; a movable abutment; an inlet-valve and an exhaust-port on both sides of said abutment; a movable stud or lug having operative connection with each of said inlet-valves and a valve-gear for opening said inlet-valves having a link provided with a contracted portion adapted to engage with either of said studs or lugs and two widened portions incapable of engaging with said studs or lugs, substantially as set forth.

18. A rotary engine having in combination a revoluble piston; a steam-space therefor; a movable abutment; an inlet-valve and an exhaust-port on both sides of said abutment; a movable stud or lug having operative connection with each of said inlet-valves; and a valve-gear for opening said inlet-valves having a link provided with a contracted portion adapted to engage with either of said studs or lugs and a widened portion converging toward said contracted portion and being incapable of engaging with said studs or lugs, substantially as set forth.

19. A rotary engine having in combination a revoluble piston; a steam-space therefor; a movable abutment; an inlet-valve and an exhaust-port on both sides of said abutment; a movable stud or lug having operative connection with each of said inlet-valves; and a valve-gear for opening said inlet-valves having a link whose opposite extremities are widened, and incapable of engagement with said lugs, and gradually converging toward a contracted portion at the mid-length of said link and which contracted portion is adapted to engage with either of said lugs or studs, substantially as set forth.

20. A rotary engine having in combination a revoluble piston; a steam-space therefor; a movable abutment; an inlet-valve and an exhaust-port on both sides of said abutment; a movable stud or lug provided with a flanged head and having operative connection with each of said inlet-valves; and a valve-gear for operating said inlet-valves having a link provided with a contracted portion adapted to engage with either of said studs or lugs and a widened portion incapable of engaging with said studs or lugs; said flanged heads being lapped over the edges of said link, substantially as set forth.

21. A rotary engine having in combination a revoluble piston; a steam-space therefor; a movable abutment; an inlet-valve and an exhaust-port on both sides of said abutment, each of said inlet-valves being provided with a stem; a bell-crank loose on each of said valve-stems; a second crank fixed on each of said stems and having a tooth; a stud carried by one arm of each of said bell-cranks; a pivoted dog carried by the other arm of each of said bell-cranks and adapted to engage one of said teeth; a cam for each of said dogs for crowding the same off said tooth; a pivoted lever having opposite ends operatively connected to said cams respectively; a governor connected with said lever for oscillating the same; means connected with each of said valve-stems and exerting a normal tendency to carry said teeth away from said pivoted dogs; a valve-gear having a link provided with a contracted portion adapted to engage said studs and widened portions incapable of engagement with said studs, substantially as set forth.

22. A rotary engine having in combination a revoluble piston-head; a steam-space therefor; a movable abutment; an inlet-valve and an exhaust-port on each side of said abutment; a movable stud having operative connection with each of said inlet-valves; a link embracing both of said studs and having a widened portion for the freedom of each of said studs and a contracted portion for engaging with either of said studs alternately; a yoke secured to said link; a support for said link connected to said yoke and having operative connection with the reversing-lever of the engine and means connected with said yoke and with a moving part of the engine for vibrating said link, substantially as set forth.

23. A rotary engine having in combination a revoluble piston-head; a shell having an annular steam-space for said piston-head and being provided with a continuous surrounding steam-jacket, one side of said shell being provided with a section removable independently of the balance of said side of the shell and also having formed therein a steam-jacket, and the said section and main portion of the shell having registering crossover-passages whereby said section will constitute a part of the said continuous steam-jacket; and means for admitting steam to and exhausting it from said steam-space, substantially as set forth.

24. A rotary engine having in combination a revoluble piston-head; a steam-space therefor provided with inlet and exhaust ports; an abutment movable independently of said piston; a bodily-movable catch having operative connection with said abutment; a reciprocating pull-rod having operative connection with said piston and being provided with a hook for pulling said catch in one direction and withdrawing said abutment; means for automatically disconnecting said hook and catch; means for returning said catch and abutment in the opposite direction; and means for controlling the supply and exhaust to and from said steam-space, substantially as set forth.

25. A rotary engine having in combination a revoluble piston-head; a steam-space therefor provided with inlet and exhaust ports; an abutment movable independently of said piston; a bodily-movable independently-rotatable catch having operative connection with said abutment; a reciprocating pull-rod having operative connection with said piston and provided with a hook for pulling said catch in one direction and thereby withdrawing said abutment; a lug or trip arranged in operative relation to said pull-rod and adapted to disengage said hook and catch; means for returning said abutment and catch to their normal positions; and means for supplying and exhausting steam to and from said steam-space, substantially as set forth.

26. A rotary engine having in combination a revoluble piston-head; a steam-space therefor provided with inlet and exhaust ports; means for controlling the admission and exhaust of steam to and from said steam-space; an abutment movable independently of said piston; a bodily-oscillatory independently-rotatable catch having operative connection with said abutment; a reciprocating pull-rod having operative connection with said piston and provided with a hook for pulling said catch in one direction and thereby withdrawing said abutment; a lug or trip revolving bodily with said catch for engaging a portion thereof and crowding said hook and catch out of engagement; and means for returning said catch and abutment to their normal positions, substantially as set forth.

27. A rotary engine having in combination a revoluble piston-head; a steam-space therefor provided with inlet and exhaust ports; means for controlling the admission of steam to and exhausting it from said space; an abutment movable independently of said piston; a bodily-movable catch having operative connection with said abutment; a reciprocating pull-rod having operative connection with said piston and provided with a hook for pulling said catch in one direction and thereby withdrawing said abutment; means for automatically disconnecting said hook and catch; a lock for holding said abutment against premature withdrawal and being arranged in the line of movement of and adapted to be disengaged by said rod; and means for returning said catch and abutment to their normal positions; substantially as set forth.

28. A rotary engine having in combination a revoluble piston-head; a steam-space therefor provided with inlet and exhaust ports; means for controlling the admission of steam to and exhausting it from said steam-space; an abutment movable independently of said piston; a bodily-movable catch having operative connection with said abutment; a reciprocating pull-rod having operative connection with said piston and being provided with a hook for pulling said catch in one direction and thereby withdrawing said abutment; a second rod supporting said first rod and having one end movable with said catch; means for automatically disconnecting said hook and catch; and means for returning said catch and abutment to their normal positions, substantially as set forth.

29. A rotary engine having in combination a revoluble piston-head; a steam-space therefor provided with inlet and exhaust ports; means for controlling the admission of steam to and exhausting it from said space; an abutment movable independently of said piston; a movable catch having operative connection with said abutment; a reciprocating pull-rod having operative connection with said piston and provided with a hook for pulling said catch in one direction and thereby withdrawing said abutment; a second rod having a telescopic connection with said first rod and the two coöperating to support each other at their meeting ends; means for automatically disconnecting said hook and catch and means for returning said catch and abutment to their normal positions, substantially as set forth.

30. A rotary engine having in combination a movable abutment; a rotary portion; a pivoted catch carried by said rotary portion; a reciprocating pull-rod adapted to engage said catch and pull it in one direction for withdrawing said abutment; means for holding said catch against independent rotation after it is engaged by said pull-rod; and means for returning said catch and abutment to their normal positions when the catch is released from the pull-rod, substantially as set forth.

31. A rotary engine having in combination a movable abutment; a rotary portion having a shoulder and being operatively connected with said abutment; a dog adapted to fall into engagement with said shoulder; a pivoted catch carried by said rotary portion and having a projecting end; a reciprocating pull-rod adapted to engage said catch and release said dog; a trip or lug revolving with said catch and adapted to engage said projecting end and prevent independent rotation of said catch; and means for returning the abutment and catch when the latter is released, substantially as set forth.

32. A rotary engine having in combination a movable abutment; a rotary portion having operative connection therewith; a sleeve having one end supported by said rotary portion; a pivoted catch carried by said rotary portion; a pull-rod reciprocating in said sleeve and having means of engagement with said catch; means for crowding said rod out of engagement with said catch; and means for returning said abutment when the catch is released from said rod, substantially as set forth.

33. A rotary engine having in combination a movable abutment; a rotary portion having operative connection therewith; a sleeve having one end supported by but movable transversely independently of said rotary portion; a pivoted catch carried by said rotary portion; a pull-rod reciprocating in said sleeve and having means of engagement with said catch; means for crowding said rod out of engagement with said catch and means for returning the abutment and catch when the latter is released, substantially as set forth.

34. A rotary engine having in combination a movable abutment; a rotary portion having operative connection therewith; a sleeve having one end provided with a transverse slot; a pivoted catch carried by said rotary portion and the pivot of which catch passes through said slot and supports said sleeve upon said rotary portion; a pull-rod reciprocating in said sleeve and having means of engagement with said catch; means for crowding said rod out of engagement with said catch; and means for returning said abutment and catch when the latter is released, substantially as set forth.

35. A rotary engine having in combination a movable abutment; a rotary portion operatively connected with said abutment and having a plain edge terminating in a shoulder; a dog arranged to engage said shoulder and having a projecting lip; a catch engaged under said projecting lip and carried by said rotary portion; a reciprocating pull-rod arranged to project between said catch and lip for simultaneously releasing said dog and engaging said catch and means for returning said abutment and catch when the latter is released, substantially as set forth.

36. A rotary engine having in combination a movable abutment; a rotary portion operatively connected with said abutment and having two shoulders and a plain edge extending between said shoulders; a pivoted dog arranged to engage one of said shoulders; a stop arranged to be struck by the other of said shoulders; a catch carried by said rotary portion; a reciprocating pull-rod arranged to be projected between said catch and pivoted dog for simultaneously releasing said dog and engaging said catch; and means for returning said abutment and catch when the latter is released, substantially as set forth.

37. A rotary engine having in combination a movable abutment; a rotary disk operatively connected with said abutment and having a plain edge terminating in two shoulders; a pivoted dog arranged to gravitate into engagement with one of said shoulders; a fixed stop arranged to be struck by the other of said shoulders; a catch pivoted to the side of said disk and having a projection; a trip or lug secured to the side of said disk and adapted to engage under the projection on said catch; a sleeve having a bifurcated end supported over said catch and said pivoted dog being provided with a lip depending into said bifurcation; a reciprocating pull-rod having a hook adapted to be projected through said sleeve between said catch and depending lip and to engage with said catch; and a dash-pot connected with said disk and exerting a normal tendency to rotate it in the opposite direction to the pull of the said rod, substantially as set forth.

38. A rotary engine having in combination a revoluble piston; a steam-space therefor; a movable abutment; inlet and exhaust valves on each side of said abutment; a valve-gear having means of operative connection with said inlet-valves alternately as the engine is reversed; a link mechanism operated by said piston; a pull-rod reciprocally connected with said link mechanism; means for operatively connecting said rod with said abutment for withdrawing the latter; means for releasing said abutment from its connection with said rod; and a reversing device operatively connected with said link and valve mechanism, substantially as set forth.

39. A rotary engine having in combination a revoluble piston; a steam-space therefor; a movable abutment; inlet and exhaust valves on each side of said abutment; a valve-gear having means of operative connection with the inlet-valves alternately as the engine is reversed; a link mechanism operated by the piston; a lever having a stud engaging in the link of said link mechanism; a pull-rod connected to one end of said lever; means for operatively connecting said pull-rod with said abutment for withdrawing the latter; means for releasing said abutment from its connection with said pull-rod and a reversing device operatively connected with said link mechanism and valve-gear, substantially as set forth.

40. A rotary engine having in combination a revoluble piston; a steam-space therefor having two sets of exhaust and inlet valves; a movable abutment arranged between said sets of valves; a valve-gear having means of operative engagement with said inlet-valves alternately as the engine is reversed; a pair of eccentrics operated by the piston; a link connected with said eccentrics; a pull-rod operatively connected with said link; means for operatively connecting said rod with said abutment for withdrawing the latter; and a reversing device operatively connected with said link and valve-gear; said eccentrics being so set with relation to said abutment-withdrawing means that the rod will begin the rapid part of its return stroke as soon as it engages with said abutment-withdrawing means, substantially as set forth.

41. A rotary engine having in combination a revoluble abutment; a catch having operative connection with said abutment; a reciprocating pull-rod having means of engagement with said catch; means for releasing said catch from said rod; the extremity of the advancing stroke of the rod being limited to the normal position of the catch whereby the rod will engage the catch substantially at the commencement of its return stroke; and means for returning said catch and abutment to their normal positions, substantially as set forth.

42. A rotary engine having in combination a removable abutment; a crank-arm having a ball-wrist secured thereto for oscillating said abutment; a rotary portion arranged in a plane at an angle to the plane of said abutment and having a ball-wrist; a pitman connecting said ball-wrists; and means for intermittently imparting partial rotation to said rotary portion alternately in opposite directions, substantially as set forth.

43. A rotary engine having in combination a revoluble piston-head; a steam-space therefor having an inlet-valve and an exhaust-port; an abutment interposed between said valve and port and being movable independently of said piston-head; means for periodically opening said valve, means acting independently of said piston and exerting a continual tendency to move said abutment in one direction, and means having positive operative connection with the piston, having a reciprocating portion; means operatively connected with said abutment and adapted to be engaged by said reciprocating portion and also being located at the beginning of the stroke of said reciprocating portion whereby the last said means and reciprocating portion will engage without shock, substantially as set forth.

WILLIAM S. COLWELL.

Witnesses:
ALEXANDER GRANT,
THOMAS M. COLWELL.